United States Patent
Ueda et al.

(10) Patent No.: US 7,112,933 B1
(45) Date of Patent: Sep. 26, 2006

(54) CONTROLLER FOR BRUSHLESS MOTOR

(75) Inventors: Takeshi Ueda, Kashiba (JP); Shigeki Nagase, Nabari (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 11/376,811

(22) Filed: Mar. 15, 2006

(30) Foreign Application Priority Data

Mar. 15, 2005 (JP) ............................. 2005-072987

(51) Int. Cl.
*H02P 3/08* (2006.01)
(52) U.S. Cl. ...................... 318/254; 318/439; 318/138; 318/727
(58) Field of Classification Search ................ 318/254, 318/138, 439, 727, 432–434, 609, 610
See application file for complete search history.

(56) References Cited

U.S. PATENT DOCUMENTS

| 6,427,104 B1 * | 7/2002 | Matsushita et al. ........... 701/41 |
| 6,504,336 B1 | 1/2003 | Sakamaki |
| 6,700,400 B1 * | 3/2004 | Atarashi ..................... 324/772 |
| 6,969,968 B1 * | 11/2005 | Throngnumchai .......... 318/807 |
| 2002/0113615 A1 * | 8/2002 | Atarashi ..................... 324/772 |

* cited by examiner

*Primary Examiner*—Rina Duda
(74) *Attorney, Agent, or Firm*—Jordan and Hamburg LLP

(57) ABSTRACT

In a controller for brushless motor which suppresses the generation of abnormal noise when the motor current is controlled by updating voltages applied to the coils, the present values of the applied voltages to the coils are calculated from the d axis target current, the q axis target current, the d axis actual current, the q axis actual current, and the present value of the detected rotational position of the rotor. The updating period of the applied voltages is set as a period that is shorter than this calculation period. The predicted value of the rotational position at a point in time at which the applied voltages are updated until the next calculation of the present values of the applied voltages is determined in accordance with the present value, a past value of the detected rotational position, and the applied voltage updating period. The predicted values of the applied voltages are calculated from the predicted value of the rotational position, the d axis target current, the q axis target current, the d axis actual current, and the q axis actual current. The applied voltages are updated in accordance with the present values and predicted values of the applied voltages.

6 Claims, 14 Drawing Sheets

APPLIED VOLTAGE (v)

APPLIED VOLTAGE (v)

APPLIED VOLTAGE (v)

CONTROLLER FOR BRUSHLESS MOTOR

FIELD OF THE INVENTION

The present invention relates to a controller for brushless motor, which performs vector control of the motor current in accordance with the rotational position of the rotor, the target current, and the actual currents flowing through the motor coils.

DESCRIPTION OF THE RELATED ART

FIG. 12 shows the controller 40" for a three-phase brushless motor 1 in a conventional example used for generating steering assist power in an electrical power steering system. The controller 40" comprises a signal processing circuit 40a, a rotational position detection part 2, current detection parts 3a, 3b and 3c, and a motor driver 7. The signal processing circuit 40a comprises a dq axis target current calculating part 4, a dq axis actual current calculating part 5, and an applied voltage calculating part 6. The rotational position detection part 2 detects the present value $\theta_0$ of the rotational angle of the rotor from a predetermined reference position in the stator of the motor 1 as the present value of the rotational position of the rotor in the motor 1. The current detection parts 3a, 3b and 3c detect the actual currents $I_u$, $I_v$ and $I_w$ in the U phase, V phase and W phase coils of the motor 1. The dq axis target current calculating part 4 calculates the d axis target current $I_d^*$ for generating the magnetic field in the direction of the d axis, and the q axis target current $I_q^*$ for generating the magnetic field in the direction of the q axis, where the d axis is the axis along the direction of the magnetic flux of the field system of the rotor, and the q axis is the axis perpendicular to the d axis and rotational axis of the rotor. For example, the d axis target current $I_d^*$ and q axis target current $I_q^*$ are calculated at the dq target value calculating parts 4b and 4c by using the predetermined functions $F_d$ and $F_q$, on the basis of the target current I* calculated by the target value calculating part 4a from the steering torque $\tau$ and vehicle speed v. The dq axis actual current calculating part 5 calculates the d axis actual current $I_d$ for generating the magnetic field in the direction of the d axis, and the q axis actual current $I_q$ for generating the magnetic field in the direction of the q axis by using a known transformation formula from the detected actual currents $I_u$, $I_v$ and $I_w$ of the coils and the present value $\theta_0$ of the detected rotational angle. The applied voltage calculating part 6 calculates the present values $v_u(0)$, $v_v(0)$ and $v_w(0)$ of the voltages applied to the coils at a set period from the d axis target current $I_d^*$, q axis target current $I_q^*$, d axis actual current $I_d$, q axis actual current $I_q$, and present value $\theta_0$ of the detected rotational angle. For example, the deviation between the d axis target current $I_d^*$ and the d axis actual current $I_d$ is determined by a deviation calculating element 6a, the d axis target voltage $v_d^*$ is determined by performing a PI (proportional integration) operation on this deviation in a PI calculating element 6c, the deviation between the q axis target current $I_q^*$ and the q axis actual current $I_q$ is determined by a deviation calculating element 6b, the q axis target voltage $v_q^*$ is determined by performing a PI operation on this deviation in a PI calculating element 6d, and the present values $v_u(0)$, $v_v(0)$ and $v_w(0)$ of the applied voltages are calculated by means of a coordinate transformation element 6e using a known transformation formula from the d axis target voltage $v_d^*$, q axis target voltage $v_q^*$, and present value $\theta_0$ of the detected rotational angle. The voltages applied to the coils are updated via the motor driver 7 in accordance with the calculated present values $v_u(0)$, $v_v(0)$ and $v_w(0)$ of the applied voltages via the motor driver 7, so that a rotational force of the rotor is generated by the variation of the magnetic field generated in the coils (see U.S. Pat. No. 6,504,336B2).

SUMMARY OF THE INVENTION

In the controller described above, a calculation loop for the voltages applied to the coils are provided separately from the calculation loop for the target current, and the calculation period for the voltages applied to the coils is set at a shorter period than the calculation period for the target current, so that control of the motor current can be performed with good precision. However, the calculation period of the present values of the voltages applied to the coils is limited not only by the calculation time, but also by the rotational position of the rotor, the detection time required for the detection of the actual current and the like. Consequently, there are limits to the extent to which this calculation period can be shortened. Accordingly, the calculation period for the present values of the voltages applied to the coils is set at approximately 200 µsec.

However, when the shortening of the calculation period for the present values of the applied voltages according to the rotational position of the rotor is limited, since the motor current varies in accordance with this calculation period, the following problem arises: namely, noise which has a noise peak in the vicinity of the frequency that is the reciprocal of this period is generated. Specifically, as is shown in FIG. 13, in the relationship between time and the voltages $v_u$, $v_v$ and $v_w$ respectively applied to the coils of the U phase, V phase and W phase, the ideal voltage applied to each coil varies in the form of a sine wave in accordance with the variation in the rotational position of the rotor. On the other hand, when the present values of the voltages applied to the respective coils are determined with a calculation period of 200 µsec, and the applied voltages are updated with this calculation period, the voltage applied to each coil varies not in the form of sine wave, but rather in the form of stepwise every 200 µsec as indicated by the two-dot chain line in FIG. 14. Accordingly, noise which has a noise peak in the vicinity of a frequency of approximately 5 kHz is generated. Furthermore, when the rotor rotates at a high speed, the current variation also increases with an increase in the voltage variation Δv at the time when the applied voltage is updated; accordingly, the noise becomes conspicuous.

It is an object of the present invention to provide a controller for brushless motor that can solve the abovementioned problems.

The present invention is applied to a controller for brushless motor having a rotor and coils, which generates force for rotating the rotor in accordance with the variation in the magnetic field generated by the coils, by updating the voltages applied to the coils. The controller comprises a rotational position detection part which detects the rotational position of the rotor, a current detection part which detects the actual currents flowing through the coils, a dq axis target current calculating part which calculates d axis target current and q axis target current, where the d axis is the axis along the direction of the magnetic flux of a field system of the rotor, and the q axis is the axis that is perpendicular to the d axis and the rotational axis of the rotor, a dq axis actual current calculating part which calculates d axis actual current and q axis actual current from detected actual currents of the coils and a present value of the detected rotational position of the rotor, and an applied voltage calculating part which calculates present values of the voltages applied to the coils at a set period from the d axis target current, q axis target current, d axis actual current, q axis actual current and present value of the detected rotational position of the rotor.

The present invention is characterizing in that the updating period of the applied voltages to the coils is set as a period that is shorter than the calculation period of the present values of the applied voltages to the coils, that a rotational position calculating part is provided to calculate a predicted value of the rotational position of the rotor at a point in time at which the applied voltages are updated until the next calculation of the present values of the applied voltages, in accordance with the present value of the detected rotational position of the rotor, a past value of the detected rotational position, and the set applied voltage updating period, that the predicted values of the applied voltages to the coils at the point in time at which the applied voltages are updated until the next calculation of the present values of the applied voltages are calculated by the applied voltage calculating part, from the d axis target current, q axis target current, d axis actual current, q axis actual current, and predicted value of the rotational position of the rotor, and that the applied voltages to the coils are updated in accordance with the calculated present value of the applied voltage and the predicted value of the applied voltage.

In the conventional controller, the updating period of the applied voltages to the coils and the calculation period of the present values of the applied voltages are set as equal periods. In the present invention, on the other hand, the updating period of the applied voltages to the coils is set as a period that is shorter than the calculation period of the present values of the applied voltages to the coils; accordingly, the amount of variation in the currents flowing through the coils at the time when the applied voltages are updated can be reduced compared to that in a conventional controller, so that the noise at the update frequency can be reduced.

In the present invention, furthermore, the predicted value of the rotational position of the rotor is determined, and the predicted values of the applied voltages to the coils are calculated from the d axis target current, q axis target current, d axis actual current, q axis actual current and predicted value of the rotational position of the rotor. Accordingly, the predicted values of the applied voltages to the coils vary in accordance with the rotational position of the rotor. As a result, the error between the predicted values of the applied voltages and the ideal values can be reduced, so that the increase in the amount of variation in the currents flowing through the coils when the applied voltages are updated can be prevented. Accordingly, the generation of noise at the frequency that is the reciprocal of the calculation period of the present values of the applied voltages and at the frequency that is the reciprocal of the updating period can be reduced.

It is desirable that predicted values of the rotational position of the rotor are calculated by the rotational position calculating part at all points in time at which the applied voltages are updated until the next calculation of the present values of the applied voltages. As a result, the respective applied voltages at all points in time at which the applied voltages are updated can be caused to correspond to the rotational position of the rotor, so that the noise at the update frequency can be reduced even further.

It is desirable that the updating period of the applied voltage is set as a period that is shorter than the calculation period of the present values of the applied voltage so that the number of times that the applied voltages are updated in one calculation period of the present values of the applied voltages is three or more, that the predicted value of the rotational position of the rotor is calculated by the rotational position calculating part at any point in time at which the applied voltages are updated until the next calculation of the present values of the applied voltages, and that an interpolation calculating part is provided to determine the predicted values of the applied voltages to the coils at the remaining points in time at which the applied voltage are updated, by interpolation using the present values of the applied voltages and predicted values of the applied voltages calculated by the applied voltage calculating part. In order to reduce the noise at the update frequency of the applied voltages to the coils, it is desirable to increase the number of times that the updating is performed.

Compared to a case where all of the predicted values of the applied voltages to the coils are calculated from the d axis target current, q axis target current, d axis actual current, q axis actual current and predicted values of the rotational position of the rotor, a case where any predicted value of the rotational position and any predicted values of the applied voltages are calculated, and the remaining predicted values of the applied voltages are calculated from the present values and any predicted values of the applied voltages, results in a smaller calculation load. Accordingly, by reducing the number of times that calculations are performed by the applied voltage calculating part and rotational position calculating part and by increasing the number of times that calculations are performed by the interpolation calculating part, it is possible to prevent increase in the calculation load even if the number of times that the updating of the applied voltages to the coils is performed is increased.

It is desirable that the updating period of the applied voltage is set at 100 μsec or less. As a result, the noise that is caused by the updating of the applied voltages can be greatly reduced. It is even more desirable to set the updating period of the abovementioned applied voltages at 50 μsec or less. As a result, since the reciprocal (20 kHz) of the updating period of the applied voltages is enough greater than the maximum frequency (about 15 to 16 kHz) of the general audible range for humans, the abnormal noise caused by the updating of the applied voltages can be reduced even further.

It is desirable that the brushless motor is driven by PWM driving, that the updating of the applied voltages to the coils is performed by updating the duty ratio of the PWM control signals, and that the signal period of the PWM control signals is caused to correspond to the updating period of the applied voltages. As a result, the present invention can easily be realized with using PWM control.

The controller for brushless motor of the present invention makes it possible to suppress the generation of abnormal noise that occurs when the motor current is controlled by updating the applied voltages to the coils, and further makes it possible to suppress increase in the calculation load for that.

DESCRIPTION OF THE PREFERRED EMBODIMENTS

A controller for a brushless motor constituting a first embodiment of the present invention is described with reference to FIGS. 1 through 8. In the present embodiment, parts that are the same as in the conventional example are labeled with the same symbols.

Figure 1:
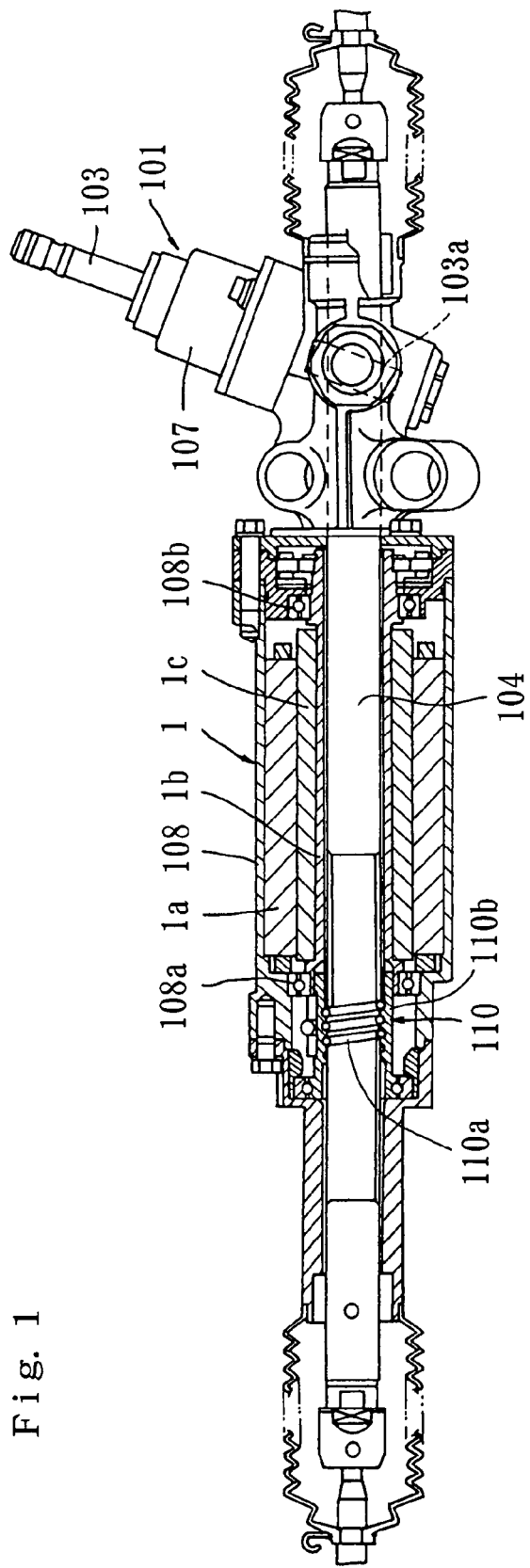
FIG. 1 is a partial sectional view of an electrical power steering apparatus constituting an embodiment of the present invention.

The rack and pinion type electrical power steering apparatus 101 for a vehicle shown in FIG. 1 comprises a steering shaft 103 that is caused to rotate by steering operation, a pinion 103a that is disposed on the steering shaft 103, and a rack 104 that engages with the pinion 103a. Both ends of the rack 104 are connected to vehicle wheels (not shown in the figures) used for steering. When the pinion 103a is caused to rotate by steering operation, the rack 104 moves in the longitudinal direction along the lateral direction of the vehicle, and the steering angle varies as a result of this movement of the rack 104. A torque sensor 107 which detects the steering torque, a three-phase brushless motor 1 which is driven in accordance with the detected steering torque, and a screw mechanism 110 which is used to transmit the rotational force of the motor 1 to the rack 104 are provided to generate steering assist force corresponding to the steering torque transmitted by the steering shaft 103.

The motor 1 has a stator 1a which includes coils of U, V and W phases and is attached to a housing 108 that covers the rack 104, a tubular rotor 1b which is supported by the housing 108 via bearings 108a and 108b so that this rotor 1b can rotate, a magnet 1c which is attached to the rotor 1b, and a rotational position sensor 2a such as an encoder or the like which constitutes a rotational position detection part 2 that detects the rotational position of the rotor 1b (see FIG. 2), and the rack 104 is surrounded by the rotor 1b. The screw mechanism 110 has a ball screw shaft 110a which is integrally formed on the outer circumference of the rack 104, and a ball nut 110b which is engaged with the ball screw shaft 110a via a ball. The ball nut 110b is connected to the rotor 1b of the motor 1. As a result, the ball nut 110b is rotationally driven by the motor 1, and the steering assist force is generated along the longitudinal direction of the rack 104 by the rotation of the ball nut 110b.

Figure 2:
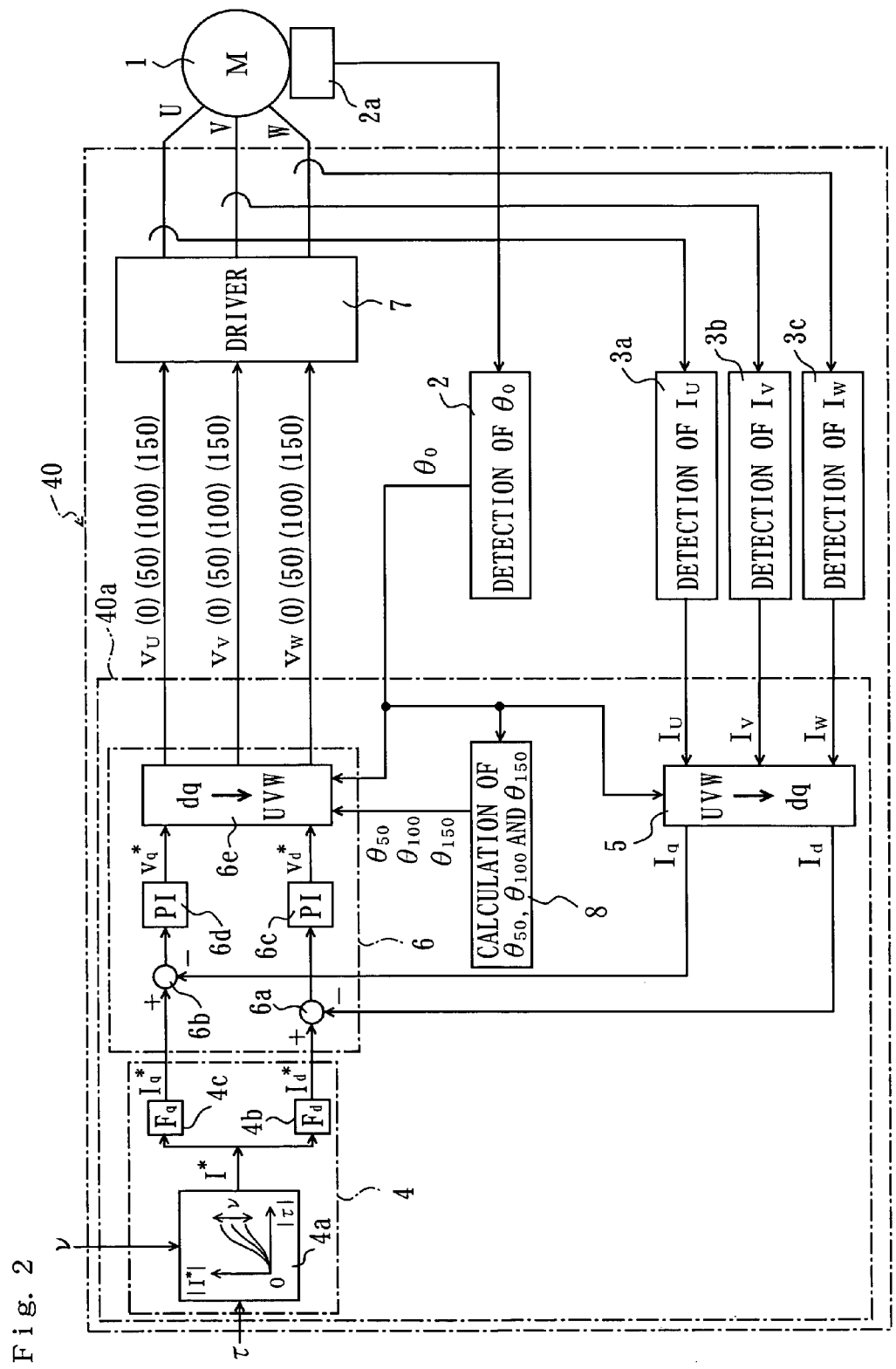
FIG. 2 is an explanatory diagram of the structure of a controller for brushless motor constituting a first embodiment of the present invention.

As shown in FIG. 2, the motor 1 is connected to a controller 40, and detection signals of the steering torque $\tau$ obtained by the torque sensor 107 and detection signals of the vehicle speed $v$ obtained by the vehicle speed sensor (not shown in the figures) are input into the controller 40. The controller 40 has a signal processing circuit 40a, a rotational position detection part 2, current detection parts 3a, 3b and 3c, and a motor driver 7. The signal processing circuit 40a comprises a dq axis target current calculating part 4, a dq axis actual current calculating part 5, an applied voltage calculating part 6, and a rotational position calculating part 8.

The rotational position detection part 2 detects the rotational angle of the rotor 1b from a predetermined reference position in the stator 1a of the motor 1 as the rotational position of the rotor 1b in the motor 1. The current detection parts 3a, 3b and 3c can be constructed from known current sensors; these current detection parts detect the actual currents $I_u$, $I_v$ and $I_w$ flowing through the respective coils of the U phase, V phase and W phase in the motor 1.

Figure 3:
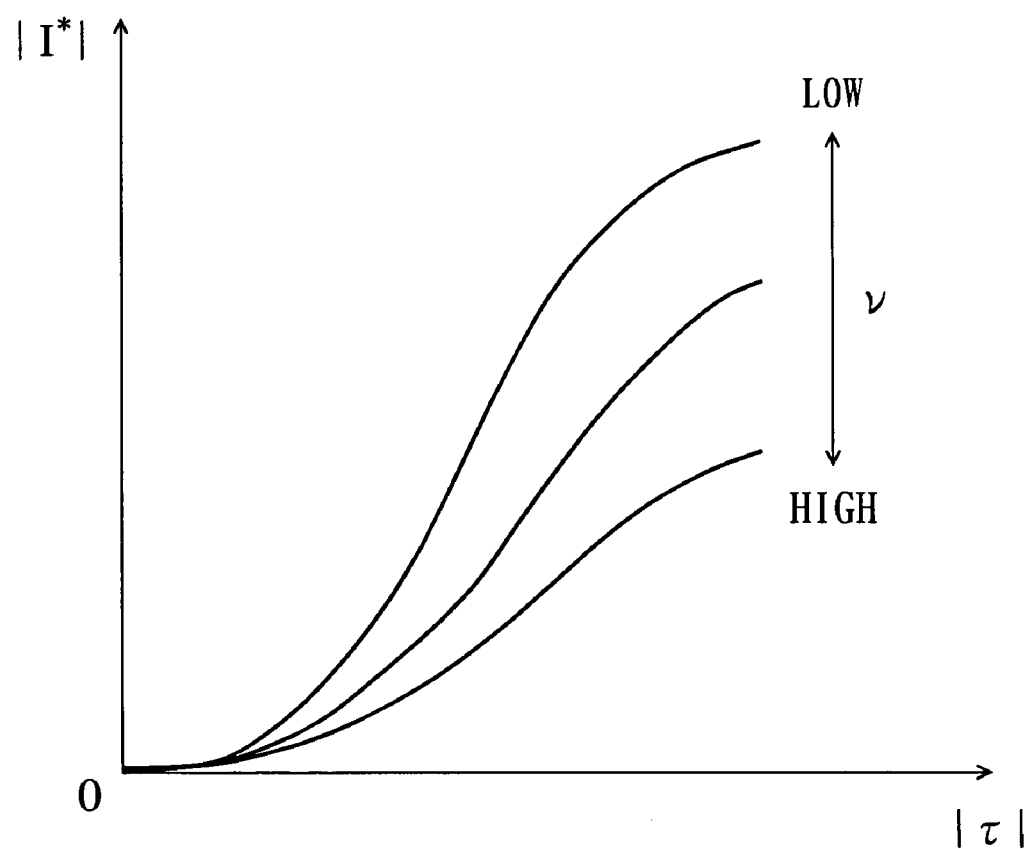
FIG. 3 is a diagram showing the relationship between the steering torque and target current in the electrical power steering apparatus constituting the embodiment of the present invention.
Figure 4:
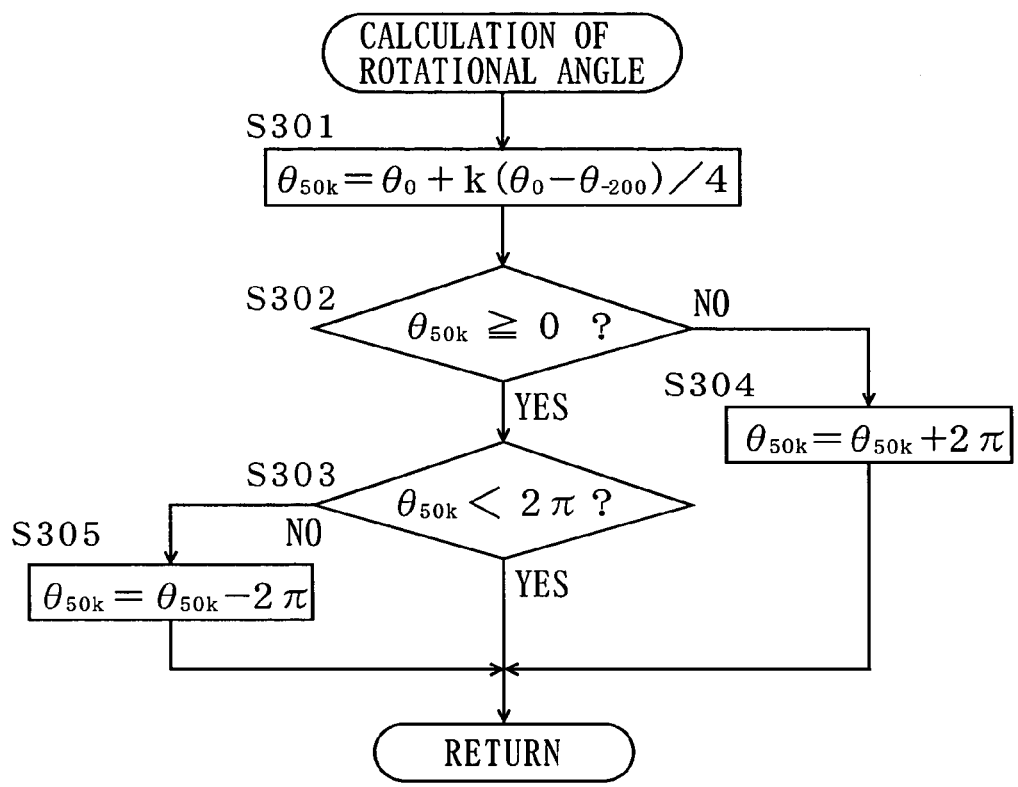
FIG. 4 is a flow chart showing the calculation routine used to calculate the predicted value of the rotational angle of the rotor in the controller for brushless motor constituting the embodiment of the present invention.

The dq axis target current calculating part 4 calculates the d axis target current $I_d^*$ for generating magnetic field in the direction of the d axis and the q axis target current $I_q^*$ for generating magnetic field in the direction of the q axis, where the d axis is the axis along the direction of the magnetic flux of the field system (magnet 1c) of the rotor 1b, and the q axis is the axis that is perpendicular to the d axis and the rotational axis of the rotor 1b. The dq axis target current calculating part 4 in the present embodiment calculates the target current $I^*$ at a set period in the target value calculating part 4a from the relationship between the steering torque $\tau$, vehicle speed $v$ and target current $I^*$, the detected steering torque $\tau$ obtained by the torque sensor 107, and the detected vehicle speed $v$ obtained by the vehicle speed sensor, in which the relationship is stored in the controller 40. The dq axis target current calculating part 4 also calculates the d axis target current $I_d^*$ and q axis target current $I_q^*$ on the basis of the target current $I^*$ using the predetermined functions $F_d$ and $F_q$ in the dq target value calculating parts 4b and 4c. It is desirable that the relationship between the steering torque $\tau$, vehicle speed $v$ and target current $I^*$ is set so that the magnitude of the target current $I^*$ increases with an increase in the magnitude of the steering torque $\tau$ and increases with a decrease in the vehicle speed $v$ as shown in FIG. 3. The calculation period at which the target current $I^*$ is calculated on the basis of the steering torque $\tau$ and vehicle speed $v$ can be set as in a convention device; for example, this period is set at 1 msec.

The dq axis actual current calculating part 5 calculates the d axis actual current $I_d$ for generating magnetic field in the direction of the d axis and the q axis actual current $I_q$ for generating magnetic field in the direction of the q axis, from the detected actual currents $I_u$, $I_v$ and $I_w$ of the coils of the respective U phase, V phase and W phase and the present value $\theta_0$ of the detected rotational angle of the rotor $1b$. The calculations performed in the dq axis actual current calculating part 5 can be accomplished using a known calculation formula. For example, these values can be determined by the following Equation (1), where [C] as a matrix.

$$\begin{bmatrix} I_d \\ I_q \end{bmatrix} = [C] \begin{bmatrix} I_U \\ I_V \\ I_W \end{bmatrix} \ldots \quad (1)$$

$$[C] = (2/3)^{1/2} \begin{bmatrix} \cos\theta_0 & \cos(\theta_0 - 2\pi/3) & \cos(\theta_0 - 4\pi/3) \\ -\sin\theta_0 & -\sin(\theta_0 - 2\pi/3) & -\sin(\theta_0 - 4\pi/3) \end{bmatrix}$$

The applied voltage calculating part 6 calculates the present values $v_u(0)$, $v_v(0)$ and $v_w(0)$ of the applied voltages to the coils at a set period (200 μsec in the present embodiment) from the d axis target current $I_d^*$, q axis target current $I_q^*$, d axis actual current $I_d$, q axis actual current $I_q$, and present value $\theta_0$ of the detected rotational angle of the rotor $1b$. The applied voltage calculating part 6 in the present embodiment determines the deviation between the d axis target current $I_d^*$ and the d axis actual current $I_d$ by means of a deviation calculating element 6a, determines the d axis target voltage $v_d^*$ by performing PI operation on this deviation in a PI calculating element 6c, determines the deviation between the q axis target current $I_q^*$ and the q axis actual current $I_q$ by means of a deviation calculating element 6b, determines the q axis target voltage $v_q^*$ by performing PI operation on this deviation in a PI calculating element 6d, and calculates the present values $v_u(0)$, $v_v(0)$ and $v_w(0)$ of the applied voltages from the d axis target voltage $v_d^*$, q axis target voltage $v_q^*$, and present value $\theta_0$ of the detected rotational angle by means of a coordinate conversion element 6e. The calculation performed in the coordinate conversion element 6e can be accomplished using a known calculation formula. For example, this can be determined by means of the following Equation (2) using the reverse matrix of the abovementioned matrix [C].

$$\begin{bmatrix} V_u \\ V_v \\ V_w \end{bmatrix} = [C]^{-1} \begin{bmatrix} V_d^* \\ V_q^* \end{bmatrix} \ldots \quad (2)$$

In the present embodiment, the updating period of the applied voltages to the coils of the respective U, V and W phases is set at 50 μsec, and is thus shorter than the calculation period (200 μsec) of the present values $v_u(0)$, $v_v(0)$ and $v_w(0)$ of the applied voltages. As a result, the number of times that the applied voltages are updated in one calculation period of the present values of the applied voltages is four times.

The rotational position calculating part 8 calculates the predicted values of the rotational angle of the rotor $1b$ at the points in time at which the applied voltages are updated until the next calculation of the present values of the applied voltages, in accordance with the present value $\theta_0$ of the detected rotational angle, a past value of the detected rotational angle, and the set applied voltage updating period. The applied voltage calculation period in the present embodiment is 200 μsec and the applied voltage updating period is 50 μsec; therefore the predicted value $\theta_{50}$ of the rotational angle at the point in time at which the applied voltages are updated 50 μsec later, the predicted value $\theta_{100}$ of the rotational angle at the point in time at which the applied voltages are updated 100 μsec later, and the predicted value $\theta_{150}$ of the rotational angle at the point in time at which the applied voltages are updated 150 μsec later are calculated after the point in time at which the applied voltages are updated to the present values $v_u(0)$, $v_v(0)$ and $v_w(0)$. In the present embodiment, the predicted values are determined by the calculation routine shown in the flow chart in FIG. 4, in which the rotational angle at the point in time at which the applied voltages are updated 200 μsec earlier before the updating to the present value is taken as the past value $\theta_{-200}$ of the detected rotational angle, the number of times that the applied voltages are updated in each calculation period of the applied voltages is taken as k (initial value=1), and the predicted value of the rotational angle at the point in time at which the kth updating of the applied voltage is performed is taken as $\theta_{50k}$. Furthermore, the units of the rotational angle are radians. First, the predicted value $\theta_{50k}$ is determined by the following Equation (3) (step 301).

$$\theta_{50k} = \theta_0 + k(\theta_0 - \theta_{-200})/4 \quad (3)$$

Next, a judgment is made as to whether or not $\theta_{50k} \geq 0$ (step S302). If $\theta_{50k} \geq 0$, a judgment is made as to whether or not $\theta_{50k} < 2\pi$ (step S303). If $\theta_{50k} < 2\pi$, $\theta_{50k}$ is taken as the predicted value of the rotational angle. If $\theta_{50k}$ is not $\geq 0$ in step S302, $\theta_{50k} + 2\pi$ is taken as the predicted value $\theta_{50k}$ of the rotational angle (step S304). If $\theta_{50k}$ is not $<2\pi$ in step S303, then $\theta_{50k} - 2\pi$ is taken as the predicted value $\theta_{50k}$ of the rotational angle (S305).

Figure 5:
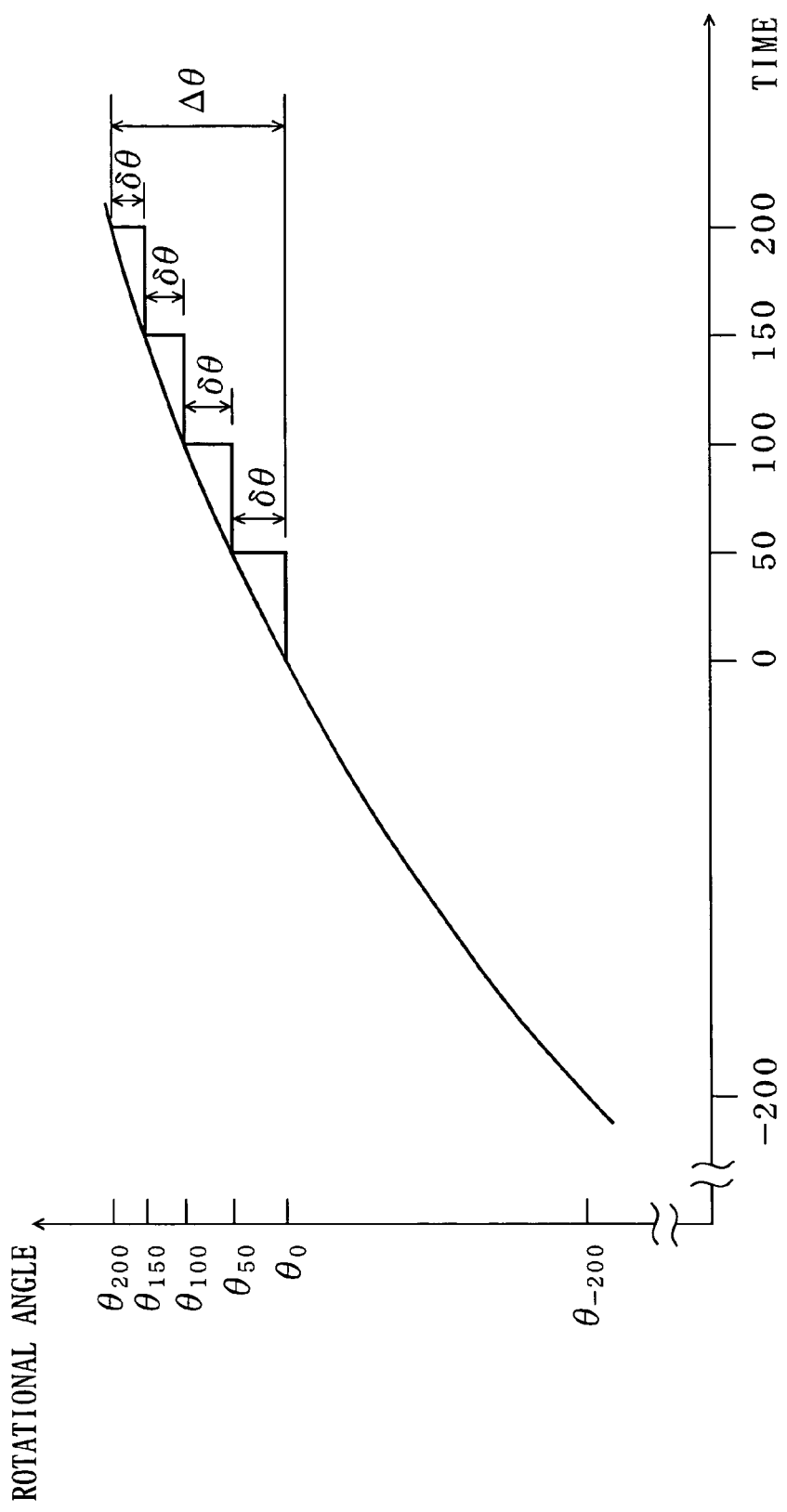
FIG. 5 is a diagram showing the relationship between the rotational angle of the rotor and time in the brushless motor constituting the embodiment of the present invention.

FIG. 5 shows the relationship between the rotational angle of the rotor $1b$ and time. It is seen that the amount of variation $\delta\theta$ in the rotational angle every 50 μsec is smaller than the amount of variation $\Delta\theta$ every 200 μsec.

Furthermore, it is also possible to devise the controller so that the predicted values of the rotational angle are determined with using not only the value at 200 μsec earlier but also an even earlier value as the past value of the detected rotational angle. For example, the mean rate of variation in the detected rotational angle is determined from these past values and the present value of the detected rotational angle, and the predicted value of the rotational angle is determined by adding the present value to a value obtained by multiplying this mean rate of variation by the time up to the point in time at which the applied voltages are updated after the updating to the present value.

The coordinate conversion element 6e of the applied voltage calculating part 6 calculates the predicted values of the applied voltages to the coils at the all points in time at which the applied voltage are updated until the next calculation of the present value of the applied voltage, from the d axis target voltage $v_d^*$, q axis target voltage $v_q^*$, present value $\theta_0$ of the detected rotational angle, and predicted values $\theta_{50}$, $\theta_{100}$ and $\theta_{150}$ of the rotational angle of the rotor $1b$. Specifically, the predicted values $v_u(50)$, $v_v(50)$ and $v_w(50)$ of the applied voltages corresponding to the predicted value $\theta_{50}$ of the rotational angle at the point in time at which the applied voltages are updated 50 μsec later, the predicted values $v_u(100)$, $v_v(100)$ and $v_w(100)$ of the applied voltages corresponding to the predicted value $\theta_{100}$ of the rotational angle at the point in time at which the applied voltages are updated 100 μsec later, and the predicted values $v_u(150)$, $v_v(150)$ and $v_w(150)$ of the applied voltages corresponding to the predicted value $\theta_{150}$ of the rotational angle at the point in time at which the applied voltages are updated 150 μsec later after the point in time at which the applied voltages are updated to the present values $v_u(0)$, $v_v(0)$ and $v_w(0)$ are calculated. The calculation of the predicted values $v_u(50)$, $v_v(50)$, $v_w(50)$, $v_u(100)$, $v_v(100)$, $v_w(100)$, $v_u(150)$, $v_v(150)$ and $v_w(150)$ of the applied voltages in the coordinate conversion element 6e can be accomplished using the same known calculation formula as that used in the calculation of the present values $v_u(0)$, $v_v(0)$ and $v_w(0)$.

The rotational force of the rotor 1b is generated by the variations in the magnetic fields generated by the coils, by updating the applied voltages to the coils via the motor driver 7 in accordance with the calculated present values $v_u(0)$, $v_v(0)$ and $v_w(0)$ of the applied voltages and the calculated predicted values $v_u(50)$, $v_v(50)$, $v_w(50)$, $v_u(100)$, $v_v(100)$, $v_w(100)$, $v_u(150)$, $v_v(150)$ and $v_w(150)$ of the applied voltages.

Figure 6:
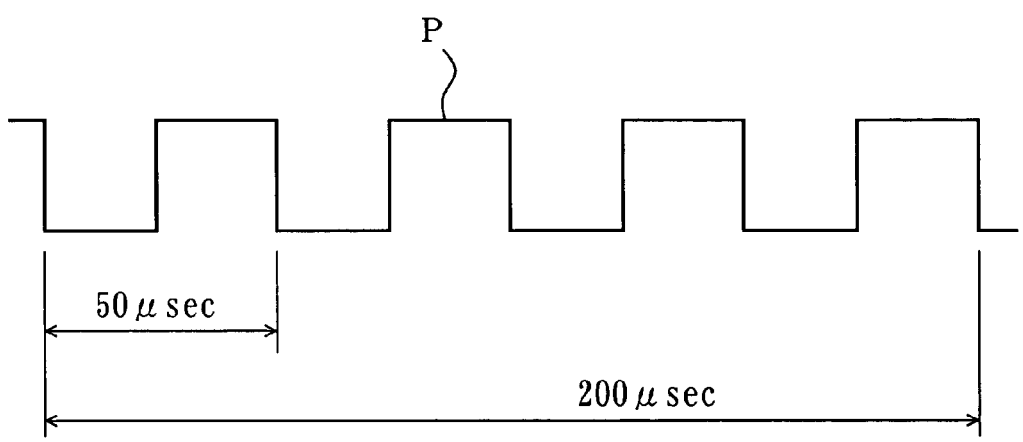
FIG. 6 is a diagram showing the period of the PWM control signals in the embodiment of the present invention.

A known motor driver which performs PWM driving of the motor 1 by means of PWM control signals is used as the motor driver 7; the present values $v_u(0)$, $v_v(0)$ and $v_w(0)$ and the predicted values $v_u(50)$, $v_v(50)$, $v_w(50)$, $v_u(100)$, $v_v(100)$, $v_w(100)$, $v_u(150)$, $v_v(150)$ and $v_w(150)$ of the applied voltages can be calculated as the duty ratios of the PWM control signals, and the updating period of the applied voltage can be correspond to the signal period of the PWM control signals. In this case, as shown in FIG. 6, the signal period of the PWM control signals P is set at 50 µsec, and the duty ratio of the PWM signals P is calculated as the applied voltage every 50 µsec. Specifically, the signal period of the PWM signals corresponds to the updating period of the applied voltage, and the applied voltages to the coils of the respective U, V and W phases of the motor 1 are updated by the updating of the duty ratios of the PWM control signals P every 50 µsec.

Figure 7:
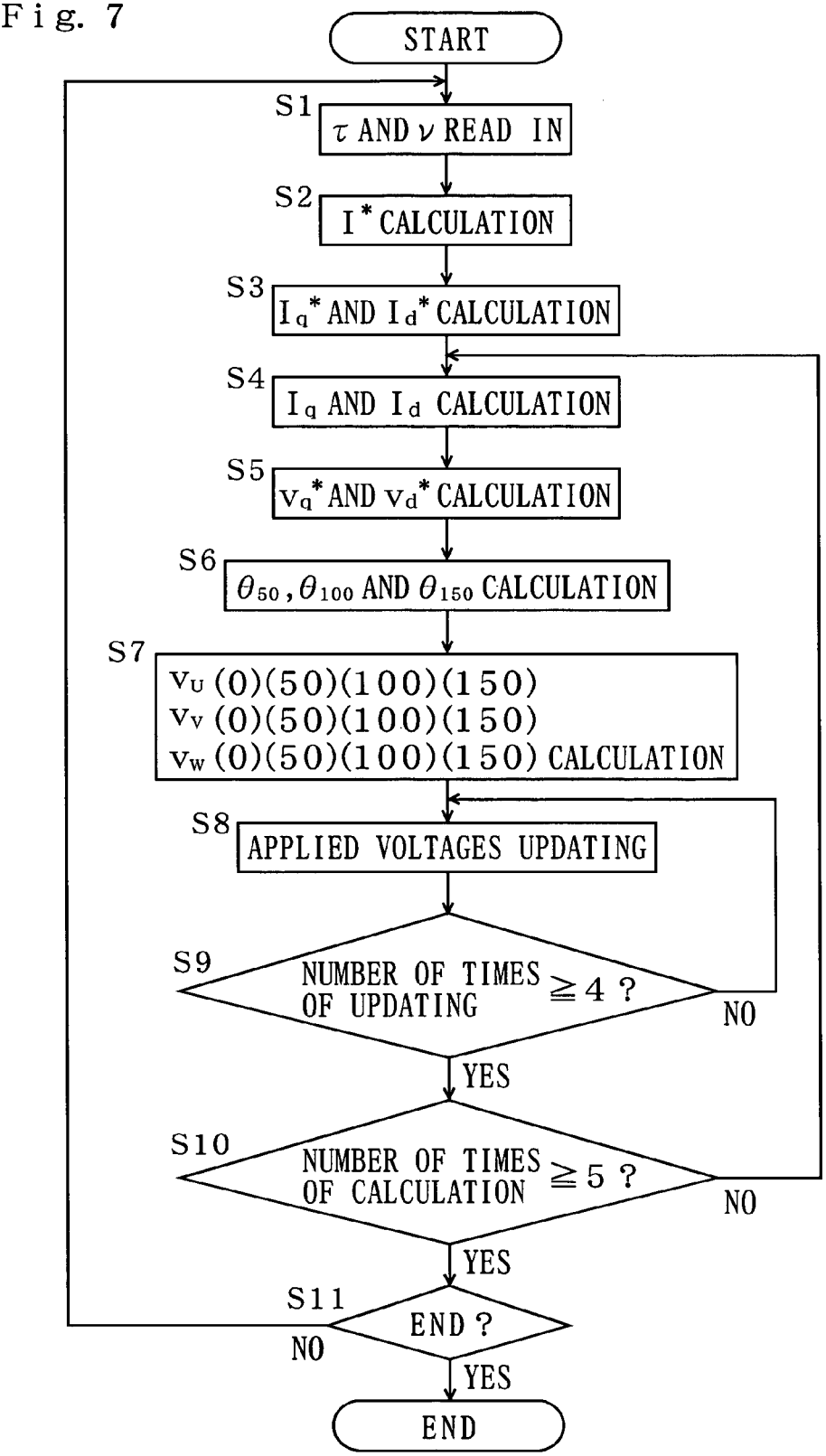
FIG. 7 is a flow chart showing the control routine of the controller for brushless motor constituting the first embodiment of the present invention.
Figure 8:
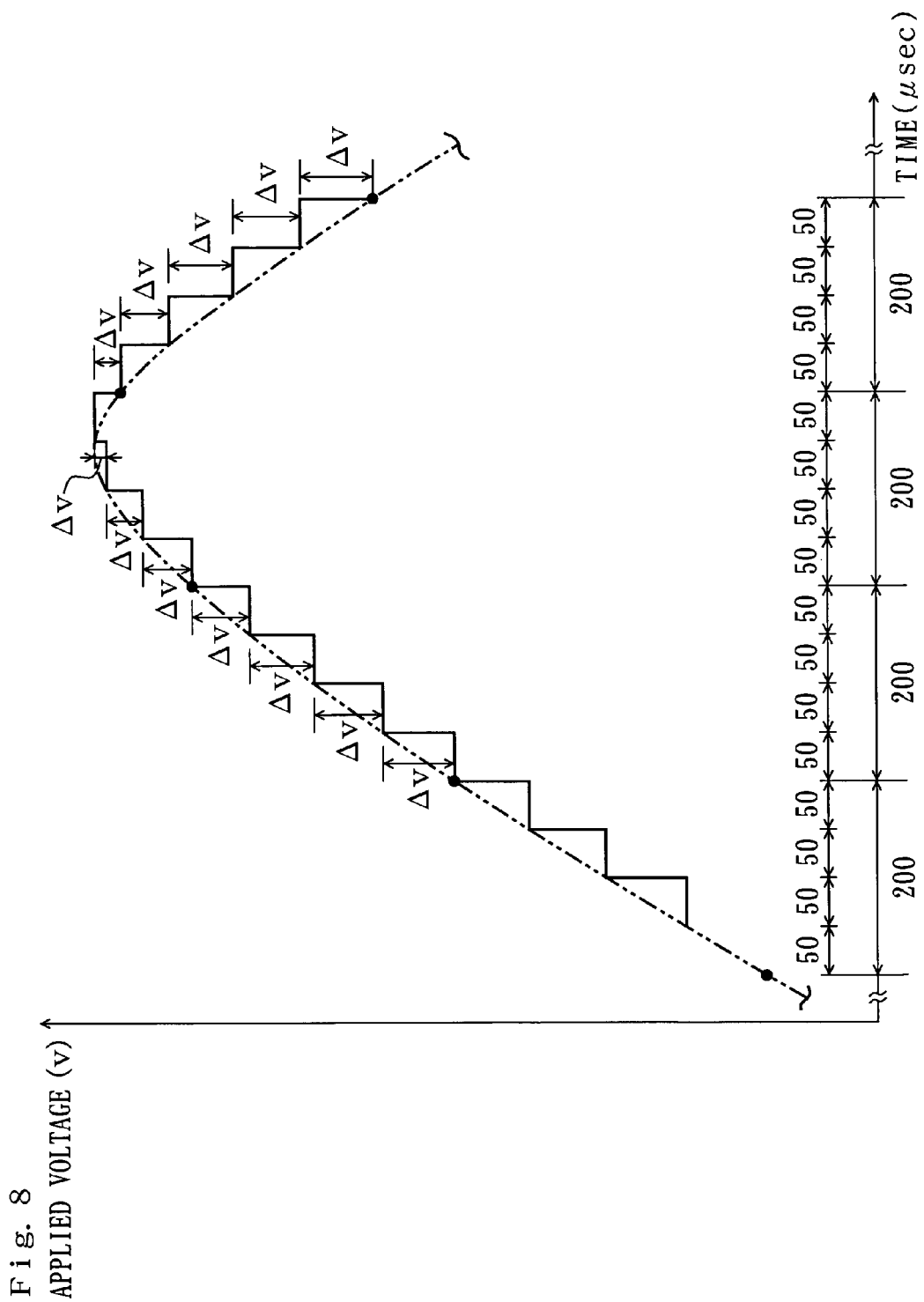
FIG. 8 is a diagram showing the relationship between the applied voltage to the coil and time in the controller for brushless motor constituting the first embodiment of the present invention.

The flow chart in FIG. 7 shows the control routine of the motor 1 using the abovementioned controller 40. First, the detection values τ and v of the steering torque sensor and vehicle speed sensor are read in (step S1), the target current I* is calculated on the basis of the detected steering torque τ and vehicle speed v (step S2), the d axis target current $I_d^*$ and q axis target current $I_q^*$ are calculated by calculations performed in the dq axis target current calculating part 4 (step S3), the detected actual currents $I_u$, $I_v$ and $I_w$ of the coils and the present value $\theta_0$ of the detected rotational angle are read in, and the d axis actual current $I_d$ and q axis actual current $I_q$ are calculated by the dq axis actual current calculating part 5 (step S4). Next, the d axis target voltage $v_d^*$ corresponding to the deviation between the d axis target current $I_d^*$ and the d axis actual current $I_d$, and the q axis target voltage $v_q^*$ corresponding to the deviation between the q axis target current $I_q^*$ and the q axis actual current $I_q$, are calculated by the PI calculating elements 6c and 6d (step S5). The predicted values $\theta_{50}$, $\theta_{100}$ and $\theta_{150}$ of the rotational angle are also calculated from the present value $\theta_0$ of the rotational angle of the rotor 1b and the past value $\theta_{-200}$ of the rotational angle by the rotational angle calculating part 8 (step S6). Next, the present values $v_u(0)$, $v_v(0)$ and $v_w(0)$ and the predicted values $v_u(50)$, $v_v(50)$, $v_w(50)$, $v_u(100)$, $v_v(100)$, $v_w(100)$, $v_u(150)$, $v_v(150)$ and $v_w(150)$ of the applied voltages to the coils of the respective phases are calculated from the d axis target voltage $v_d^*$, q axis target voltage $v_q^*$, present value $\theta_0$ of the detected rotational angle, and predicted values $\theta_{50}$, $\theta_{100}$ and $\theta_{150}$ (step S7). Subsequently, the applied voltages to the coils are updated (step S8). The updating of the applied voltages to the coils is first performed in accordance with the present values $v_u(0)$, $v_v(0)$ and $v_w(0)$, then in accordance with the predicted values $v_u(50)$, $v_v(50)$ and $v_w(50)$ after 50 µsec, then in accordance with the predicted values $v_u(100)$, $v_v(100)$ and $v_w(100)$ after 100 µsec, and then in accordance with the predicted values $v_u(150)$, $v_v(150)$ and $v_w(150)$ after 150 µsec. Next, a judgment is made as to whether or not the applied voltages have been updated a number of times (four times) corresponding to the applied voltage calculation period (200 µsec) (step S9). If the applied voltages have not been thus updated, the processing returns to step S8. If the applied voltages have been thus updated, a judgment is made as to whether or not the present values $v_u(0)$, $v_v(0)$ and $v_w(0)$ of the applied voltages have been calculated a number of times (e.g., five times) corresponding to the target current calculation period (e.g., 1 msec) (step S10). If these present values have not been thus calculated, the processing returns to step S4. If these present values have been thus calculated, a judgment is made as to whether or not control is to be ended, e.g., in accordance with the on-off state of the ignition switch (step S11). In cases where control is not to be ended, the processing returns to step S1.

In the abovementioned embodiment, the updating period (50 µsec) of the applied voltages to the coils of the brushless motor 1 is set at a shorter period than the calculation period (200 µsec) of the present values $v_u(0)$, $v_v(0)$ and $v_w(0)$ of the applied voltages; accordingly, the amount of variation in the current that flows through the coils during the updating of the applied voltages can be reduced compared to that in a conventional controller, so that the noise that occurs at the update frequency can be reduced. Furthermore, the predicted values $v_u(50)$, $v_v(50)$, $v_w(50)$, $v_u(100)$, $v_v(100)$, $v_w(100)$, $v_u(150)$, $v_v(150)$ and $v_w(150)$ of the applied voltages to the coils, which are calculated from the d axis target current $I_d^*$, q axis target current $I_q^*$, d axis actual current $I_d$, q axis actual current Iq, and predicted values $\theta_{50}$, $\theta_{100}$ and $\theta_{150}$ of the rotational angle of the rotor 1b, vary in accordance with the rotational position of the rotor 1b. As a result, the error between the predicted values $v_u(50)$, $v_v(50)$, $v_w(50)$, $v_u(100)$, $v_v(100)$, $v_w(100)$, $v_u(150)$, $v_v(150)$ and $v_w(150)$ of the applied voltages and the ideal values can be reduced. Accordingly, in the relationship between time and the applied voltages (v) applied to the coils shown in FIG. 8, the variation in the applied voltages Δv during updating can be reduced even in the vicinity of the peaks of the sine wave indicated by the two-dot chain line shown in the drawing, which corresponds to the variation in the ideal values of the applied voltages in accordance with the rotational position of the rotor 1b. Accordingly, an increase in the amount of variation in the currents flowing through the coils can be prevented, so that the generation of noise at the frequency that is the reciprocal of the calculation period (200 µsec) of the present values $v_u(0)$, $v_v(0)$ and $v_w(0)$ of the applied voltages and at the frequency that is the reciprocal of the updating period (50 µsec) of the applied voltages can be reduced. Furthermore, in the first embodiment, since the predicted values $\theta_{50}$, $\theta_{100}$ and $\theta_{150}$ of the rotational angle of the rotor 1b at the all points in time at which the applied voltages are updated until the next calculation of the present values of the applied voltages are calculated, the respective applied voltages at all points in time at which the applied voltages are updated can be caused to correspond to the rotational position of the rotor 1b, so that the noise at the updating frequency can be reduced even further. Furthermore, as a result of the updating period of the applied voltages being set at 50 µsec or less, the reciprocal (20 kHz) of this period is enough greater than the maximum value (about 15 to 16 kHz) of the frequency range that is generally audible to humans; accordingly, the abnormal noise that is caused by the updating of the applied voltages can be greatly reduced.

Figure 9:
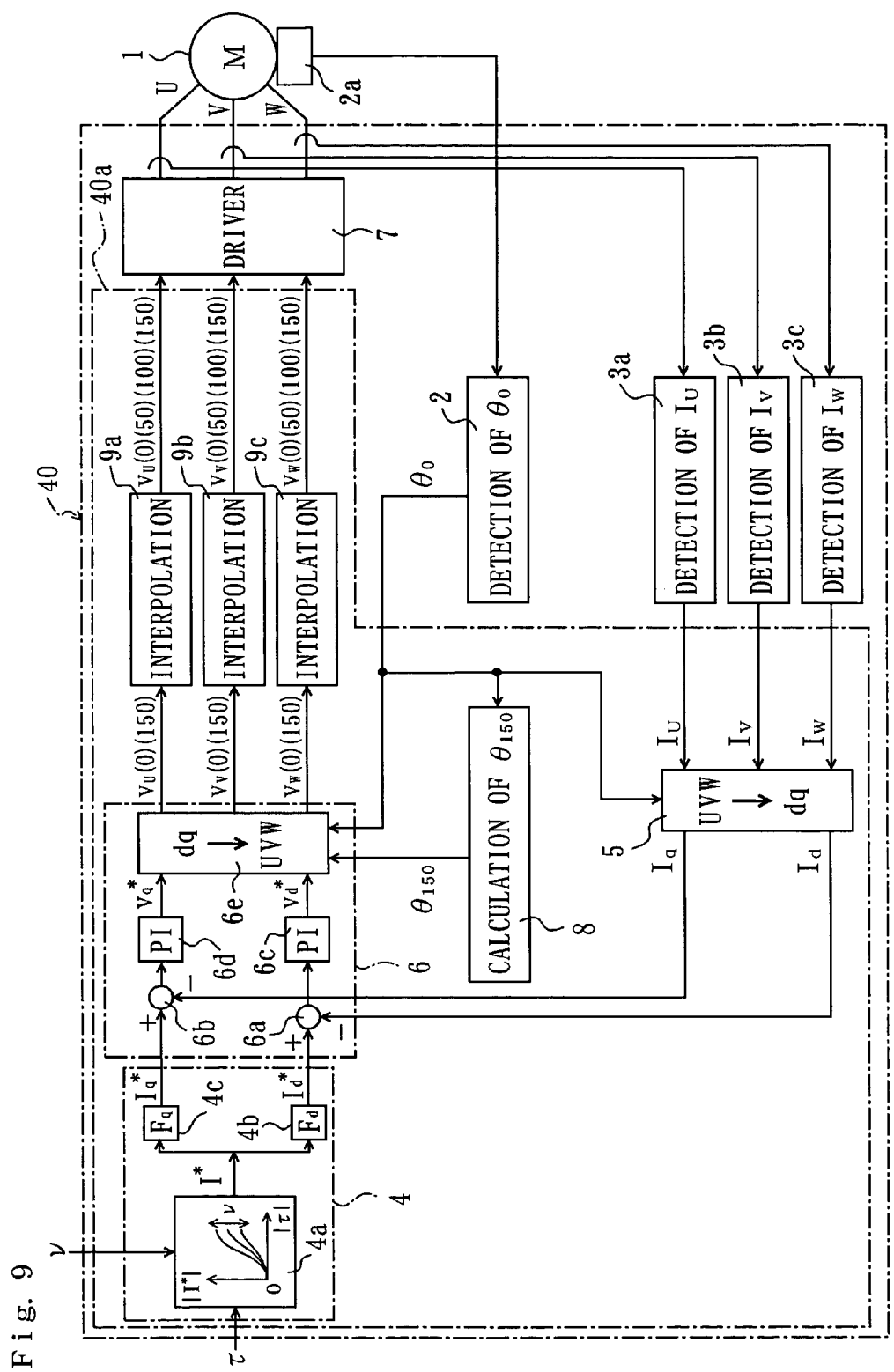
FIG. 9 is an explanatory diagram of the structure of a controller for brushless motor constituting a second embodiment of the present invention.
Figure 10:
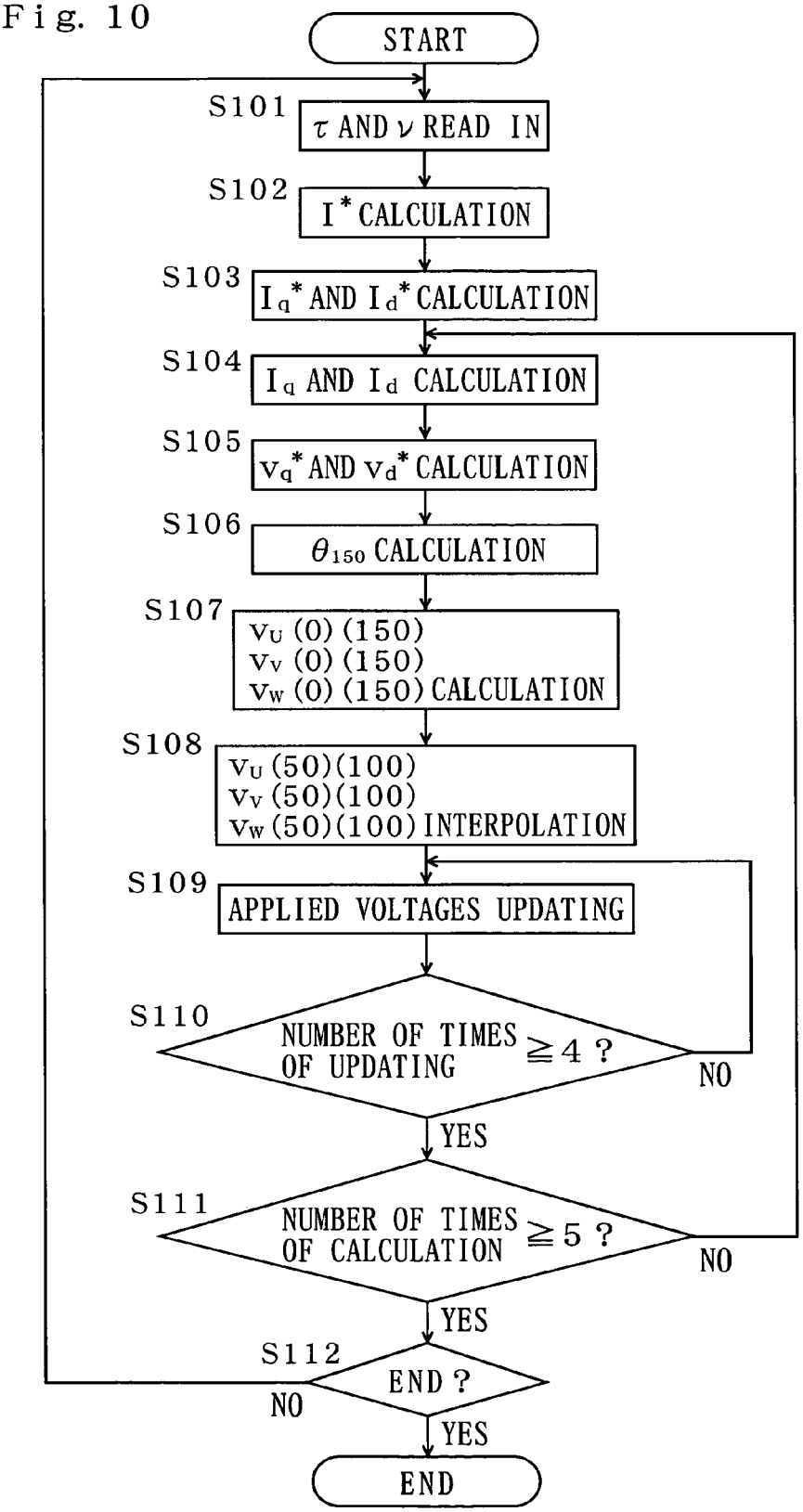
FIG. 10 is a flow chart showing the control routine of the controller for brushless motor constituting the second embodiment of the present invention.
Figure 11:
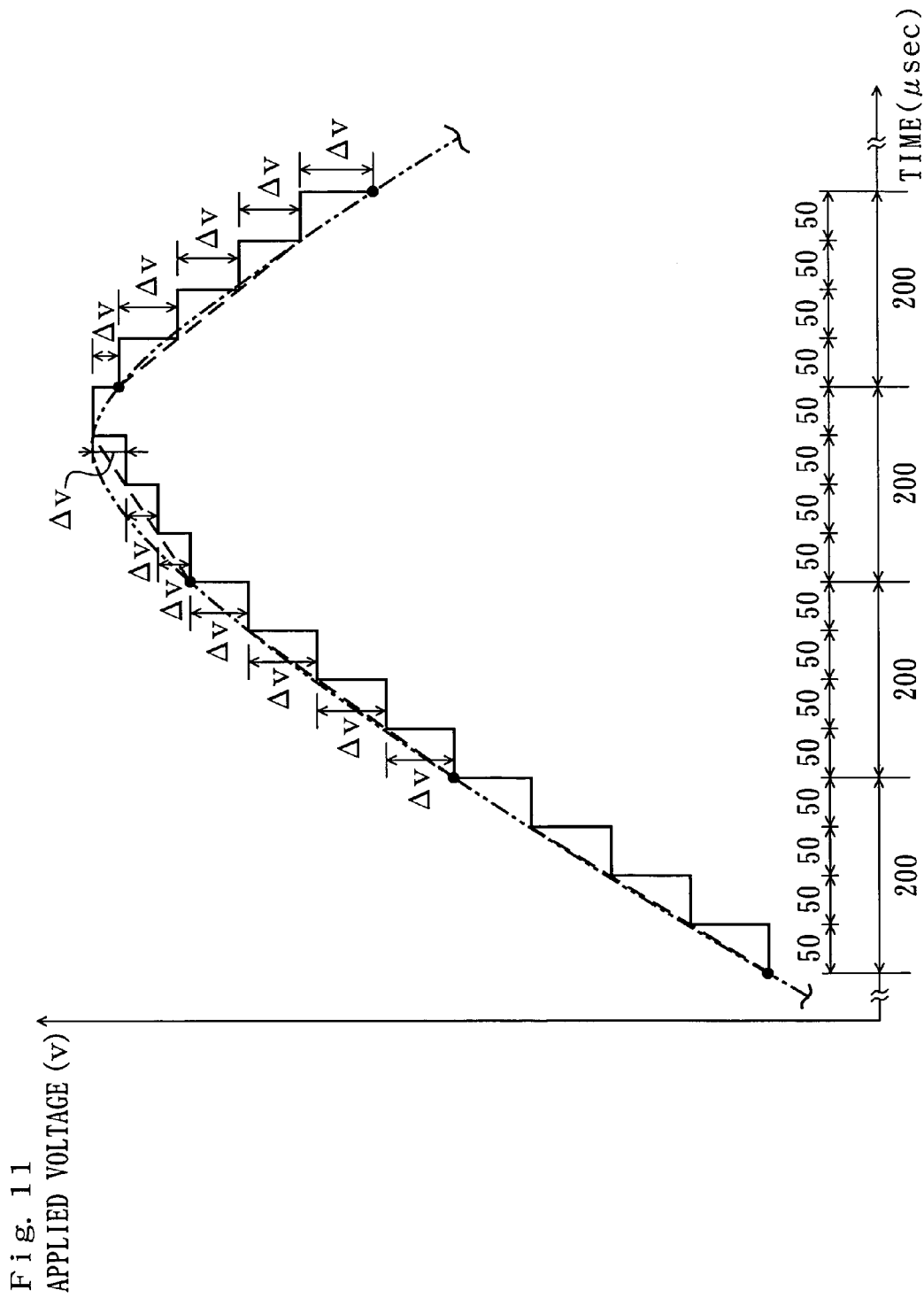
FIG. 11 is a diagram showing the relationship between the applied voltage to the coil and time in the controller for brushless motor constituting the second embodiment of the present invention.
Figure 12:
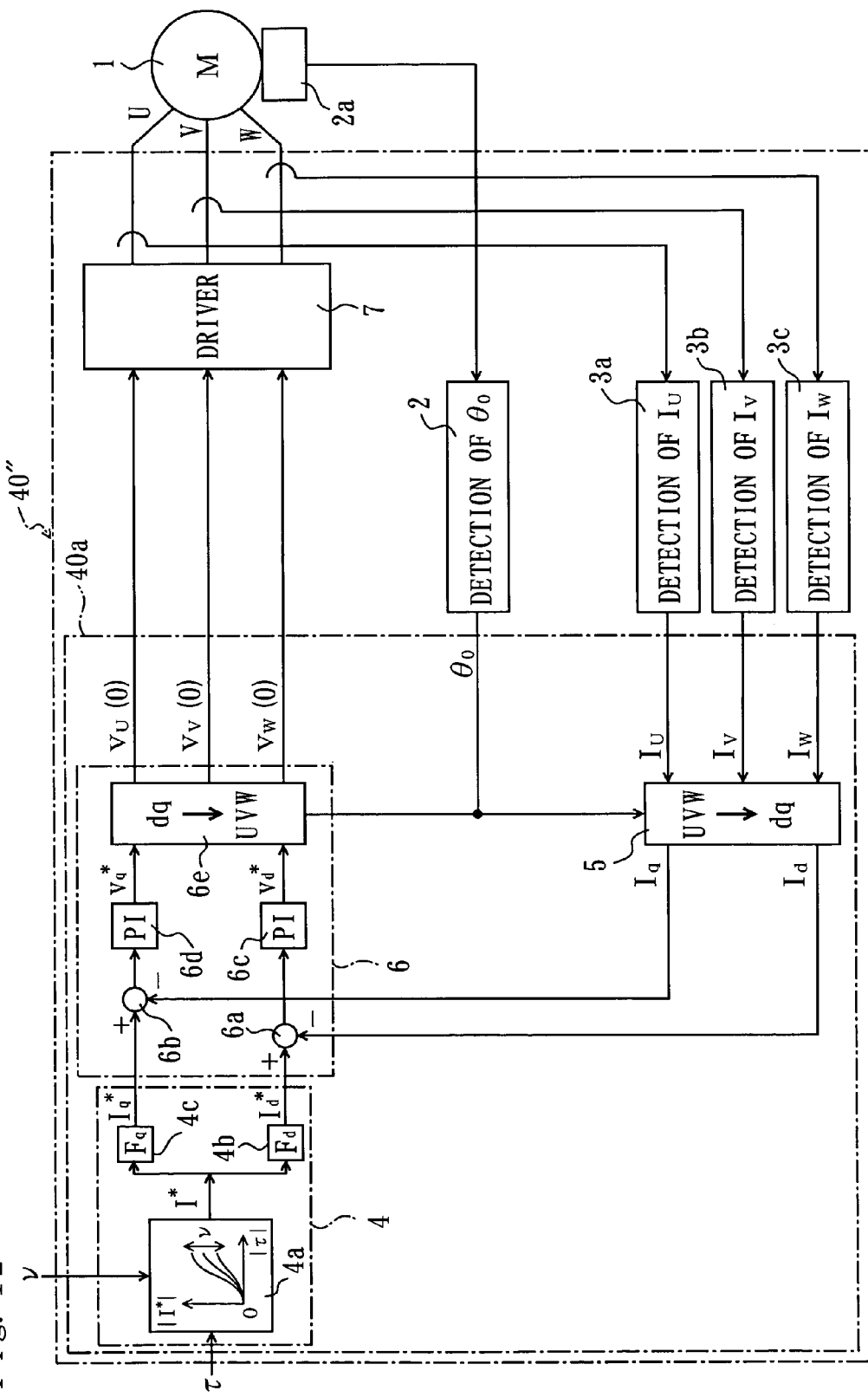
FIG. 12 is an explanatory diagram of the structure of a conventional example of a controller for brushless motor.
Figure 13:
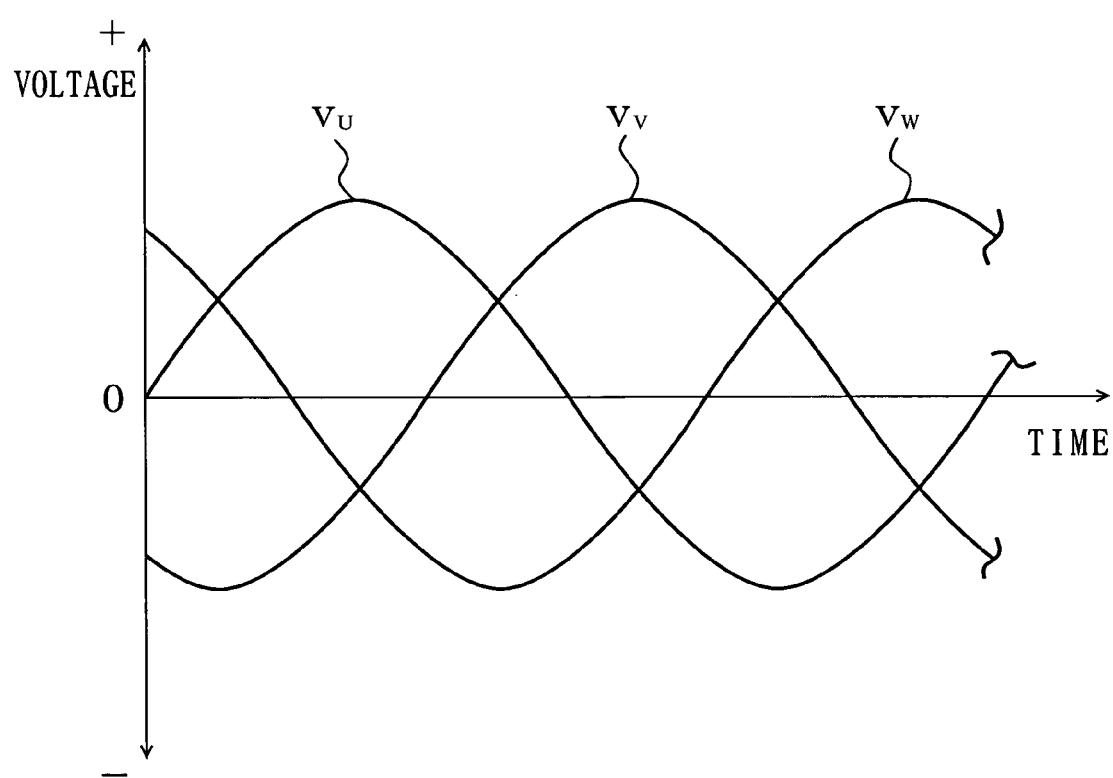
FIG. 13 is a diagram showing the relationship between the ideal applied voltages to the coils and time in a controller for brushless motor.
Figure 14:
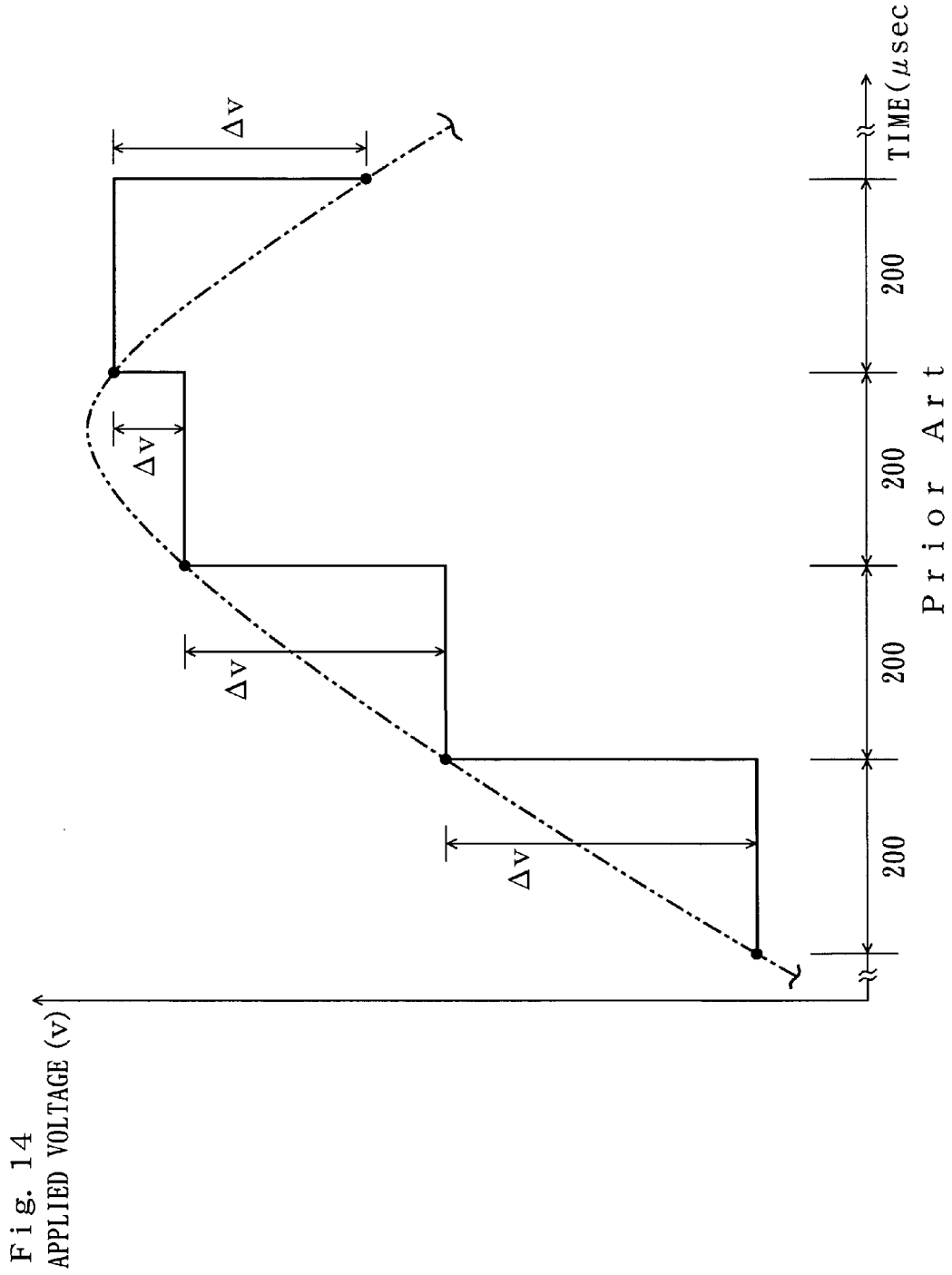
FIG. 14 is a diagram showing the relationship between the applied voltage to the coil and time in the conventional example of the controller for brushless motor.

FIGS. 9 through 11 show a controller for a three-phase brushless motor 1 in a second embodiment used to generate steering assist force in an electrical power steering apparatus. In the present embodiment, parts that are the same as in the first embodiment are labeled with the same symbols. The differences between this embodiment and the first embodiment are as follows. In the first place, the predicted value of the rotational angle of the rotor 1b is calculated by the rotational position calculating part 8 at any point in time at which the applied voltages are updated until the next calculation of the present values $v_u(0)$, $v_v(0)$ and $v_w(0)$ of the applied voltages. The rotational position calculating part 8 of the present embodiment calculates only the predicted value $\theta_{150}$ of the rotational angle at the point in time at which the applied voltages are updated 150 μsec later after the updating of the applied voltages to the present values $v_u(0)$, $v_v(0)$ and $v_w(0)$.

The coordinate conversion element 6e of the applied voltage calculating part 6 of the present embodiment calculates only the present values $v_u(0)$, $v_v(0)$ and $v_w(0)$ of the applied voltages and the predicted values $v_u(150)$, $v_v(150)$ and $v_w(150)$ of the applied voltages corresponding to the predicted value $\theta_{150}$ of the rotational angle at the point in time at which the applied voltages are updated 150 μsec later after the updating of the applied voltages to the present values $v_u(0)$, $v_v(0)$ and $v_w(0)$, from the d axis target voltage $v_d^*$, the q axis target voltage $v_q^*$, and the present value $\theta_0$ and predicted value $\theta_{150}$ of the rotational angle of the rotor b1.

In the second embodiment, interpolation calculating parts 9a, 9b and 9c are connected to the coordinate conversion element 6e. The interpolation calculating parts 9a, 9b and 9c determine the predicted values $v_u(50)$, $v_v(50)$, $v_w(50)$, $v_u(100)$, $v_v(100)$ and $v_w(100)$ of the applied voltages to the coils at the remaining points in time at which the applied voltages are updated, i.e., the points in time at which the applied voltages are updated 50 μsec and 100 μsec later after the updating of the applied voltages to the present values $v_u(0)$, $v_v(0)$ and $v_w(0)$, by interpolation using the present values $v_u(0)$, $v_v(0)$ and $v_w(0)$ and predicted values $v_u(150)$, $v_v(150)$ and $v_w(150)$ of the applied voltage values calculated by the coordinate conversion element 6e of the applied voltage calculating part 6. The interpolation performed in the present embodiment is linear interpolation; however, there are no particular restrictions on the interpolation method used.

The applied voltages to the coils are updated via the motor driver 7 in accordance with the present values $v_u(0)$, $v_v(0)$ and $v_w(0)$ and predicted values $v_u(150)$, $v_v(150)$ and $v_w(150)$ of the applied voltages calculated by the applied voltage calculating part 6, and the predicted values $v_u(50)$, $v_v(50)$, $v_w(50)$, $v_u(100)$, $v_v(100)$ and $v_w(100)$ of the applied voltages calculated by the interpolation calculating parts 9a, 9b and 9c, so that rotational force of the rotor 1b is generated by the variation of the magnetic field generated by the coils. The remaining structure is the same as in the first embodiment.

The flow chart in FIG. 10 shows the control routine of the motor 1 performed by the controller 40 of the second embodiment. Following steps S101 through S105 which are the same as steps S1 through S5 in the first embodiment, the predicted value $\theta_{150}$ of the rotational angle is calculated from the present value $\theta_0$ and past value $\theta_{-200}$ of the detected rotational angle of the rotor 1b by the rotational position calculating part 8 in step S106. Next, in step S107, the present values $v_u(0)$, $v_v(0)$ and $v_w(0)$ and predicted values $v_u(150)$, $v_v(150)$ and $v_w(150)$ of the applied voltages to the coils of the respective phases are calculated from the d axis target voltage $v_d^*$, q axis target voltage $v_q^*$, present value $\theta_0$ of the detected rotational angle, and predicted value $\theta_{150}$. Subsequently, in step S108, the predicted values $v_u(50)$, $v_v(50)$, $v_w(50)$, $v_u(100)$, $v_v(100)$ and $v_w(100)$ of the applied voltages to the coils are determined by the interpolation calculating parts 9a, 9b and 9c. The subsequent steps S109 through S112 are the same as steps S8 through S11 in the first embodiment.

Compared to a method in which all of the predicted values $v_u(50)$, $v_v(50)$, $v_w(50)$, $v_u(100)$, $v_v(100)$, $v_w(100)$, $v_u(150)$, $v_v(150)$ and $v_w(150)$ of the applied voltages to the coils are determined from the d axis target voltage $v_d^*$, q axis target voltage $v_q^*$, and predicted values of the rotational position of the rotor 1b, a method in which only some of the predicted values $v_u(150)$, $v_v(150)$ and $v_w(150)$ are determined and the remaining predicted values $v_u(50)$, $v_v(50)$, $v_w(50)$, $v_u(100)$, $v_v(100)$ and $v_w(100)$ are determined by interpolation from the present values $v_u(0)$, $v_v(0)$ and $v_w(0)$ and some of the predicted values $v_u(150)$, $v_v(150)$ and $v_w(150)$ results in a smaller calculation load. Accordingly, in the second embodiment, the number of times that calculations are performed by the coordinate conversion element 6e of the applied voltage calculating part 6 and the rotational position calculating part 8 is reduced, and the number of times that calculations are performed by the interpolation calculating parts 9a, 9b and 9c is increased, so that an increase in the calculation load can be prevented even if the number of times that the applied voltage to the coils is updated is increased. FIG. 11 shows the relationship between time and the applied voltages (v) applied to the coils in the second embodiment. It is seen that the variation Δv in the applied voltage at the time of updating can be reduced even in the vicinity of the peaks of the sine wave indicated by a two-dot chain line in FIG. 11, which corresponds to the ideal variation in the applied voltage in accordance with the rotational position of the rotor 1b. Accordingly, the increase in the amount of variation in the currents flowing through the coils can be prevented, so that the generation of noise at the frequency that is the reciprocal of the calculation period (200 μsec) of the present values $v_u(0)$, $v_v(0)$ and $v_w(0)$ of the applied voltages and at the frequency that is the reciprocal of the updating period (50 μsec) of the applied voltages can be reduced. Furthermore, as a result of the updating period of the applied voltages being set at 50 μsec or less, the reciprocal (20 kHz) of this period is enough greater than the maximum frequency (about 15 to 16 kHz) of the range that is generally audible to humans, so that abnormal noise caused by the updating of the applied voltages can be greatly reduced.

The following Table 1 shows the abnormal noise peak value at 4.5 kHz to 5.5 kHz in a case where the rpm of the motor 1 was set at 1200 RPM, the overall value of the noise level in the same case, the increased calculation time compared to the conventional example, and the error with respective to the ideal applied voltages to the coils (with the conventional example taken as 100), in the conventional example, the first embodiment, and the second embodiment. It can be confirmed from Table 1 that the generation of noise in the first and second embodiments is reduced compared to the conventional example, and the error with respect to the ideal applied voltages is also reduced; furthermore, it can be confirmed that the calculation load in the second embodiment is reduced compared to that in the first embodiment.

TABLE 1

|  | Conventional Example | First Embodiment | Second Embodiment |
|---|---|---|---|
| Abnormal noise peak value at 4.5 kHz to 5.5 kHz | 43 dB (A) | 10 dB (A) | 13 dB (A) |
| Overall value of noise level at 4.5 kHz to 5.5 kHz | 44 dB (A) | 20 dB (A) | 21 dB (A) |
| Increased calculation time from conventional example | — | +36 μsec | +19 μsec |
| Error with respect to ideal applied voltage (conventional example = 100) | 100 | 23.9 | 24.0 |

The following Table 2 shows the abnormal noise peak value at a frequency of 4.5 kHz to 5.5 kHz in a case where the updating period of the applied voltages was set at 100 μsec and the rpm of the motor 1 was set at 1200 RPM, the overall value of the noise level at a frequency of 4.5 kHz to 5.5 kHz in the same case, the abnormal noise peak value at a frequency of 9.5 kHz to 10.5 kHz in the same case, and the overall value of the noise level at a frequency of 9.5 kHz to 10.5 kHz in the same case, in a conventional example and the first embodiment. It can be confirmed from Table 2 that the first embodiment reduces the generation of noise compared to the conventional example.

TABLE 2

|  | Conventional Example | First Embodiment (100 μsec update) |
|---|---|---|
| Abnormal noise peak value at 4.5 kHz to 5.5 kHz | 43 dB (A) | 10 dB (A) |
| Overall value of noise level at 4.5 kHz to 5.5 kHz | 44 dB (A) | 23 dB (A) |
| Abnormal noise peak value at 9.5 kHz to 10.5 kHz | 21.8 dB (A) | 13 dB (A) |
| Overall value of noise level at 9.5 kHz to 10.5 kHz | 25 dB (A) | 23 dB (A) |

The present invention is not limited to the abovementioned embodiments. For example, there are no particular restrictions on the updating period of the applied voltages as long as this updating period is shorter than the calculation period of the applied voltages; however, it is desirable to set this updating period at 50 μsec or less. The present invention can be applied as long as the number of times that the applied voltages are updated in one calculation period of the present values of the applied voltages is two times or greater, and the calculation load can be reduced as in the second embodiment by setting this number of times at three times or greater. Furthermore, the calculation period of the present values of the applied voltages is not limited to 200 μsec. The coordinate conversion element in the abovementioned embodiments calculates the applied voltages to the coils of the respective U, V and W phases from the d axis target voltage $v_d^*$, q axis target voltage $v_q^*$, and detected rotational position of the rotor; however, it is also possible to devise the controller so that the applied voltages of two phases among U, V and W are calculated, and the applied voltage of the remaining phase is determined from these determined applied voltages. Furthermore, the brushless motor is not limited to three phases, and the use of the motor is not limited to the generation of steering assist force.

What is claimed is:

1. A controller for a brushless motor having a rotor and coils, which generates force for rotating said rotor in accordance with the variation in the magnetic field generated by said coils by updating the voltages applied to said coils, comprising:
    a rotational position detection part which detects the rotational position of said rotor;
    a current detection part which detects actual currents flowing through said coils;
    a dq axis target current calculating part which calculates d axis target current and q axis target current, where said d axis is the axis along the direction of the magnetic flux of a field system of said rotor, and said q axis is the axis that is perpendicular to said d axis and the rotational axis of said rotor;
    a dq axis actual current calculating part which calculates d axis actual current and q axis actual current from detected actual currents of said coils and a present value of the detected rotational position of said rotor; and
    an applied voltage calculating part which calculates present values of the applied voltages to said coils at a set period from the d axis target current, q axis target current, d axis actual current, q axis actual current, and present value of the detected rotational position of said rotor;
    wherein the updating period of the applied voltages to said coils is set at a period that is shorter than the calculation period of the present values of the applied voltages to said coils,
    a rotational position calculating part is provided to calculate a predicted value of the rotational position of said rotor at a point in time at which the applied voltages are updated until the next calculation of the present values of the applied voltages, in accordance with the present value of the detected rotational position of said rotor, a past value of the detected rotational position, and the set applied voltage updating period,
    predicted values of the applied voltages to said coils at the point in time at which the applied voltages are updated until the next calculation of the present values of the applied voltages are calculated by said applied voltage calculating part, from the d axis target current, q axis target current, d axis actual current, q axis actual current, and predicted value of the rotational position of said rotor, and
    the applied voltages to said coils are updated in accordance with the calculated present values of the applied voltages and the calculated predicted values of the applied voltages.

2. The controller for brushless motor according to claim 1, wherein the predicted values of the rotational position of said rotor are calculated by said rotational position calculating part at all points in time at which the applied voltages are updated until the next calculation of the present values of the applied voltages.

3. The controller for brushless motor according to claim 1, wherein the updating period of said applied voltages is set as a period that is shorter than the calculation period of the present values of the applied voltages so that the number of times that said applied voltages are updated in one calculation period of the present values of said applied voltages is three or more, the predicted value of the rotational position of said rotor is calculated by said rotational position calculating part at any point in time at which the applied voltages are updated until the next calculation of the present values of the applied voltages, and an interpolation calculating part is provided to determine the predicted values of the applied voltages to said coils at the remaining points in time at which the applied voltages are updated, by interpolation using the present values of the applied voltages and predicted values of the applied voltages calculated by said applied voltage calculating part.

4. The controller for brushless motor according to claim 1, wherein the updating period of said applied voltages is set at 100 μsec or less.

5. The controller for brushless motor according to claim 2, wherein the updating period of said applied voltages is set at 100 μsec or less.

6. The controller for brushless motor according to claim 3, wherein the updating period of said applied voltages is set at 100 μsec or less.

* * * * *